(12) United States Patent
Groneberg-Nienstedt

(10) Patent No.: US 8,962,055 B2
(45) Date of Patent: *Feb. 24, 2015

(54) METHOD AND DEVICE FOR PRODUCING FORMED FOOD PRODUCTS AND FOOD PRODUCT

(75) Inventor: Petra Groneberg-Nienstedt, Düsseldorf (DE)

(73) Assignee: Nienstedt GmbH, Haltern am See (DE)

( * ) Notice: Subject to any disclaimer, the term of this patent is extended or adjusted under 35 U.S.C. 154(b) by 867 days.

This patent is subject to a terminal disclaimer.

(21) Appl. No.: 12/739,626

(22) PCT Filed: Oct. 25, 2007

(86) PCT No.: PCT/EP2007/061497
§ 371 (c)(1),
(2), (4) Date: Apr. 23, 2010

(87) PCT Pub. No.: WO2009/052865
PCT Pub. Date: Apr. 30, 2009

(65) Prior Publication Data
US 2010/0310734 A1    Dec. 9, 2010

(51) Int. Cl.
A23P 1/10    (2006.01)

(52) U.S. Cl.
USPC .................... 426/512; 426/513; 426/518

(58) Field of Classification Search
USPC ......... 426/512–513, 515, 524, 231, 389, 281, 426/518, 256, 395, 397
See application file for complete search history.

(56) References Cited

U.S. PATENT DOCUMENTS

| | | | |
|---|---|---|---|
| 2,521,995 A | 9/1950 | Priddy | |
| 2,798,814 A | 7/1957 | Rivoche | |
| 3,728,136 A | 4/1973 | Langlands | |
| 3,892,988 A * | 7/1975 | Gran | 310/50 |
| 4,036,997 A | 7/1977 | VerBurg | |
| 4,276,314 A | 6/1981 | Anderson | |
| 4,626,436 A | 12/1986 | Bradley et al. | |
| 4,868,951 A | 9/1989 | Akesson et al. | |
| 4,973,492 A | 11/1990 | Gibson | |
| 5,223,297 A | 6/1993 | Theys et al. | |
| 5,518,746 A | 5/1996 | Diaz | |
| 5,631,035 A | 5/1997 | Clarke et al. | |
| 5,690,989 A | 11/1997 | Clarke et al. | |
| 6,826,989 B1 | 12/2004 | Wattles et al. | |
| 2003/0044501 A1 | 3/2003 | Groneberg-Nienstedt et al. | |
| 2003/0113422 A1 | 6/2003 | Groneberg-Nienstedt et al. | |
| 2004/0231480 A1 | 11/2004 | Wattles et al. | |
| 2005/0181099 A1 | 8/2005 | Tazuke et al. | |
| 2005/0282482 A1 | 12/2005 | Groneberg-Nienstedt | |
| 2008/0038426 A1 | 2/2008 | Groneberg-Nienstedt et al. | |
| 2009/0029027 A1 | 1/2009 | Groneberg-Nienstedt et al. | |
| 2009/0220660 A1 | 9/2009 | Meunier | |
| 2009/0246333 A1 | 10/2009 | Groneberg-Nienstedt et al. | |

FOREIGN PATENT DOCUMENTS

| | | |
|---|---|---|
| DE | 22 35 517 A1 | 1/1973 |
| DE | 198 06 391 A1 | 8/1999 |
| DE | 101 41 989 A1 | 4/2003 |
| DE | 101 64 637 A1 | 6/2003 |
| DE | 102 20 006 A1 | 11/2003 |
| DE | 10 2005 016 159 A1 | 10/2006 |
| EP | 0 168 909 A2 | 1/1986 |
| EP | 0 288 592 A1 | 11/1988 |
| EP | 1 470 754 A1 | 10/2004 |
| EP | 1 156 720 B1 | 2/2005 |
| EP | 1 595 456 A2 | 11/2005 |
| FR | 2 847 427 A1 | 5/2004 |
| GB | 2 280 869 A | 2/1995 |
| WO | WO 97/10717 A1 | 3/1997 |
| WO | WO 03/077662 A1 | 9/2003 |
| WO | WO 2006/053601 A1 | 5/2006 |
| WO | WO 2006/105821 A1 | 10/2006 |
| WO | WO 2007/085773 A1 | 8/2007 |
| WO | WO 2007/096363 A1 | 8/2007 |
| WO | WO 2007/096365 A1 | 8/2007 |

OTHER PUBLICATIONS

Office Action mailed on Jun. 27, 2011 regarding U.S. Appl. No. 12/280,056.

Office Action mailed on Nov. 5, 2010 regarding U.S. Appl. No. 12/280,056.

U.S. Appl. No. 12/280,064, filed May 26, 2009, Groneberg-Nienstedt et al.

U.S. Appl. No. 12/280,056, filed May 26, 2009, Groneberg-Nienstedt et al.

Author anonymous, Abstract of "Finger foods—new process offers exciting possibilities," FTSA database—Database Accession No. 86-3-10-g0028 regarding Food Review, vol. 13, No. 1, 1986, p. 19, one page.

Office Action mailed on Jan. 30, 2012 regarding U.S. Appl. No. 12/280,056.

(Continued)

*Primary Examiner* — Steven Leff
(74) *Attorney, Agent, or Firm* — Panitch Schwarze Belisario Nadel LLP

(57) ABSTRACT

A formed food product is made by first performing a first pressing of the frozen primary product between a stamp and a cavity of a mold with a predetermined force to produce a preformed initial food product. Then, without removing the initial food product from the mold and immediately after the first pressing is completed, reducing during a relaxation phase a pressure force applied by the stamp to the intermediate food product for a predetermined time to produce an intermediate product. Finally without removing the intermediate product from the mold and immediately after the predetermined time has elapsed, performing a second pressing of the intermediate food product between the stamp and the mold cavity at a higher force than that used in the first pressing until a final food product with a contour corresponding to that of the mold cavity is achieved.

42 Claims, No Drawings

(56) References Cited

OTHER PUBLICATIONS

Office Action mailed on Feb. 22, 2012 regarding U.S. Appl. No. 12/280,064.

Office Action mailed on Apr. 23, 2013 regarding U.S. Appl. No. 12/280,056.

* cited by examiner

METHOD AND DEVICE FOR PRODUCING FORMED FOOD PRODUCTS AND FOOD PRODUCT

CROSS REFERENCE TO RELATED APPLICATIONS

This application is the US-national stage of PCT application PCT/EP2007/061497 filed 25 Oct. 2007 and claiming the priority of PCT patent application PCT/EP2007/061497 itself filed 25 Oct. 2007.

FIELD OF THE INVENTION

The invention relates to a method for producing formed food products in which a frozen primary product is produced from one or a plurality of foods, which contain in particular meat, fish, game, poultry, carbohydrates and/or vegetables, or a combination and/or a mixture composed thereof, and the primary product is formed into the food product with a desired contour as part of processing in a processing line by at least one forming process, wherein during the forming process at least one stamp presses the primary product against a flat or contoured abutment in order to produce the contour.

BACKGROUND OF THE INVENTION

The invention further relates to a device for implementing this method and a food product which is produced according to this method.

Methods for producing formed food products of this type are known from EP 1 156 720 B 1. In this method, whole pieces of grown meat are used as the primary product, which are introduced into a mold cavity and reformed into a geometry which is predefined by the mold cavity by a stamp. Depending on the height and width of the primary product, reforming must be carried out to a greater or lesser extent. The piece of meat formed in this manner is then removed from the mold cavity and can then be fed to further processing, in particular to a cooking or other preparation process.

Although meat products with a desired form can be produced with the known method, there is the risk owing to the reforming of the meat that the structure of this meat is changed, despite processing which is as gentle as possible, to such an extent that the piece of meat produced in this manner differs from a natural piece of meat, in particular with respect to its visual appearance, tenderness and bite for the consumer.

Furthermore, the risk always exists with large deformation distances that cracks occur inadvertently in the cell structure of the meat, which can destroy the impression of a cohesive piece of meat, or during the subsequent cooking process can lead to the meat falling apart along this crack, discolorations appearing at these points, other ingredients entering these regions of destroyed cell structure or the product at least seeming fibrous.

OBJECT OF THE INVENTION

The object of the invention is therefore to modify the method given at the start in such a manner that the primary product can be reformed more gently so that on the one hand the applicability of the method can be extended to other types of primary product and on the other hand the primary product is damaged as little as possible by the reforming process.

SUMMARY AND SPECIFIC DESCRIPTION OF THE INVENTION

This object is achieved according to the invention in that the stamp applies the pressure in at least two partial pressing steps, which are separated from each other by an intermediate step or a pause, wherein in a first partial pressing step the primary product is preformed and in a second partial pressing step the primary product is further formed by increasing the pressure and/or by further applying the stamp in the direction of the abutment.

The reforming, also referred to in the technical field with the technical term "shaping," is now carried out in individual steps or in a cyclical manner by the method according to the invention. Two or more partial pressing steps are carried out consecutively, wherein an intermediate step is provided in each case after the partial pressing steps. This intermediate step can consist of just a pause in which the stamp stops in its current position without withdrawing or decreasing.

It is however also possible for the intermediate step to contain either a withdrawal of the stamp as far as loss of contact with the primary product or also for further method steps to be used within the intermediate step. For example it would be possible with a corresponding configuration of the forming device for the stamp, during the intermediate step, rather than being further lowered, to maintain its pressure on the primary product continuously and ensure relaxation of the preformed parts of the primary product by means of a relative movement between the abutment and the primary product or between the stamp and the primary product in massage directions which are arranged at right angles to the pressing direction.

According to the invention all types of foods, including those for animal nutrition, can be used as primary products. The invention is therefore not restricted to the preparation of meat, poultry or fish, including the interior of the said meat or fish products and including any fully or partially precooked or prepared or otherwise already partially processed products, all other foods and recipes of foods, for example vegetables, bread or pasta or similar can be used.

An essential feature of the preferred forming method is the fact that the primary product is first deep-frozen either as a natural product or as a preprocessed product, with in this case a temperature being selected which ensures that, despite any salt content, the primary product is cooled to a temperature below its freezing point or the freezing point of any liquids contained in the primary product. In general the application of the invention should not be restricted to this, in theory an incompletely frozen mixture or a completely thawed primary product can also be processed by the method according to the invention, with it being possible for such primary products to be conceivable even if a further cooking process is carried out directly after the forming process.

An example of the preparation of the primary product before it is subjected to the method according to the invention is the preparation of meat pieces. When processing meat products, the meat is usually prepared before the forming process by the known method of tumbling, in which spice marinades are massaged into the meat. The composition of the natural meat is changed by the addition of the spice marinade by this massage process, so that in this case a shift will take place in the freezing point from the freezing point of water towards the lower temperatures. Accordingly, the primary product is cooled to a correspondingly lower temperature so that it can be reformed in the frozen state.

In the case of vegetable mixtures, vegetable-filled meat or pasta or the like, the freezing point can be reduced by embedded recipe constituents such as spice sauces, mustard portions or also certain basic products. In this case too a suitable temperature preferably ensures that a frozen primary product is processed.

This frozen primary product has the advantage compared to a non-frozen primary product that it is substantially more stable after reforming as a consequence of embrittlement owing to the freezing process and the adhesive forces of the liquid crystals which arise with the freezing process. In principle, the application of the invention to non-frozen formed products is also conceivable, so the following description of the advantages which are essential to the invention is not intended to be restricted to frozen formed products but rather should be understood to mean that the invention can be implemented particularly advantageously with frozen primary products.

In the simplest case, the invention can just effect a compression of the primary product without using a specific, well-like mold cavity. Such a method is conceivable for example for producing preforms which are to be further processed subsequently as Wiener schnitzel. As these schnitzel are known to have a very thin meat layer, in this case a normal piece of meat can be pressed to the desired thinness.

An alternative configuration of the invention uses in contrast a molding cavity into which the primary product is pressed. In this case a food product can be produced by a selected contour, which product can have either a particularly funny shape in order to make it more attractive to children, or has the shape of a natural food despite an originally different shape. It is therefore possible for example to produce a food from meat sections of any shape, the shape of which food corresponds to a steak or a hamburger.

In addition to the processing of meat, the method according to the invention can also be used in the preparation of all other foods. It is thus not only possible for vegetable products to be formed for example, but it is also conceivable for pasta to be produced in this manner or in particular for combinations of the said products to be used as the primary product. The use of frozen primary products can not only be sensible for the reason of better processability of the frozen material, but also the prevention of contamination, for example by salmonella in the case of egg- or poultry-containing products, is substantially improved here.

According to the invention, the method of reforming in the proposed partial pressing steps is then carried out, wherein a simple configuration of the invention consists in that the stamp is lowered in a cyclical manner onto the primary product and thus achieves the desired reforming gradually in a light hammering movement. The duration of the partial pressing steps can in principle be set as desired, partial pressing steps between 0.1 seconds and 60 seconds, in particular between 0.5 seconds and 2 seconds have proved particularly advantageous. The advantageous duration of a partial pressing step ultimately also depends on the required degree of deformation and of course on the material of the inserted primary product.

In one possible process implementation it is possible for the deformation speed to be measured during the forming process, in order to be able to react to unexpected states, in particular a high degree of deformation. If for example meat with a wide variety of geometries but the same weight is introduced into the forming device, the degree of deformation which is necessary to produce uniform products can vary very greatly depending on the basic shape. In this case it can be sensible in the event of high degrees of deformation to interrupt the affected partial pressing step, which would be the partial pressing step which is applied for longer per se, early in order to allow the highly deformed meat a period of rest for internal relaxation or to relax this meat by the said massage steps.

A preferred configuration of the method according to the invention uses not only two but a multiplicity of partial pressing steps, for example 10, 20 or 30 partial pressing steps. These partial pressing steps can have a uniform or different duration. It has proved advantageous in particular in conjunction with the deformation of meat for example in an application that more than 5, for example approximately 10-15 partial pressing steps are used, which have in each case a length of approximately one second. In each case a pause which can likewise be one second is provided in between. In this manner an effect is produced which corresponds approximately to a continuous, light hammering, with the stamp moving slightly further towards the abutment with each partial pressing step.

It can be sensible to configure the length and the pressure to be applied of the partial pressing steps differently for each material of the primary product and the required or expected degree of deformation. For example, it can be advisable to shorten the partial pressing steps with increasing deformation, which can be recommended in particular in primary products which have a compression to be equalized which is small in the transverse direction but great in the pressure direction. In this case the first coarse deformation can be carried out with a correspondingly large travel distance of the stamp, whereas the later, final forming occurs with smaller distances, but with correspondingly greater quantities of meat to be deformed owing to the larger contact area. In the later stage it can then be sensible to reduce the deformation distances for example by shortening the duration of the partial pressing steps.

Depending on the shape of the primary product, however, the opposite approach can also lead to the large travel distances taking place in smaller stages whereas the smaller travel distances can be carried out with whole-area contact in one step. This can for example be advisable if the primary product consists of a mixture of very different foods and a mixture or product projects upwards in the center which is to be pressed in its width slowly downwards by the forming process in such a manner that it is pressed for example into the lower mass, a pasta product for example, but does not fall apart beforehand. Alternatively or additionally to this, a reduced reforming pressure can of course be used instead of a reduced reforming distance at later or earlier times. In order to process the primary product gently, the reforming pressure can be applied to stamp in a wide variety of ways during the individual partial pressing steps. In the simplest case a "spontaneously forming pressing step" is used, in which the pressure desired for the respective partial pressing step is transmitted spontaneously, that is, without any intentional delay and fully to the stamp. If this pressure then leads to a certain deformation of the primary product, the pressure can be reduced by this deformation, as the pressure system also partly relaxes during a merely brief introduction of the working pressure into the working piston of the stamp by the movement of the stamp and the associated enlargement of the working piston. The working pressure can however also be maintained unchanged so that a correspondingly faster further deformation can take place.

Alternatively a purely distance-controlled spontaneous deformation can take place, wherein during this partial pressing step the deformation can be carried out along a predefined, in particular straight course of the stamp, irrespective of the reaction of the primary product. The wide variety of partial pressing steps can be combined with each other in any desired manner according to requirements or experience with the processing.

Different intermediate phases can be provided between the partial pressing steps. In most cases it will be sufficient to allow the partially reformed primary product a pause during which the structures of the primary product can recover from the reforming pressure or also broken frost connections can be closed up again by renewed freezing together. The latter is recommended in particular when reforming loose mixtures such as pasta or rice products which are only bound together by the frost connection of the individual constituents. In this case a new bond can be produced by adding water vapor or similar measures.

In other cases it can in contrast be sensible to increase the recovery of the primary product by subjecting the primary product to a massage. The stamp can thus for example execute rotary or translatory movements in the plane at right angles to the pressing direction. In this case it should of course be held in contact with the surface of the partially reformed primary product so that a slight rolling or kneading load of the meat is produced, with phases of lateral displacement or relaxation. This can be reinforced by a tumbling movement of the stamp which can also be exchanged for the stamp of the partial pressing step. Ultrasound excitement of the stamp is also possible to calm the primary product.

Finally, a kinematic reversal of the above-mentioned measures can of course also take place, so that the abutment then executes the corresponding movements and the stamp remains still. A combination of moved stamp and moved abutment is of course also possible to have an effect on both sides of the primary product.

During the still phases, the stamp can also be withdrawn by a defined distance. Defined distance means in this case moving back by a certain distance, but also means that the stamp may yield by a certain counterpressure, that is, readjust itself depending on the pressure. The latter is in particular sensible if, as described above, a massage function of the primary product is to be implemented by a movement of the stamp.

An undesirable restoration of the partial deformation by a memory effect can also be restricted or prevented in this manner, as with the pressure-dependent restoration a certain forming effect of the stamp is retained even during the rest phase. In this manner a further deformation can take place, for example by flowing of the material under stress, even during the rest phase and the reduction of the stresses inside the individual layers of the primary product.

In principle, the withdrawal of the stamp or the yielding of the pressure is conceivable in any possible manner and can in a simple case take place by simply withdrawing the stamp by a certain distance. Alternatively, the application pressure can also simply be reduced partially or to ambient pressure. It is furthermore also possible to carry out the withdrawal of the stamp more slowly along a straight, progressive or also degressive distance and/or pressure profile.

A further configuration of the method according to the invention has partial pressing steps which are composed of a distance-controlled forming phase and a pressure-controlled forming phase. During the distance-controlled forming phase, the stamp is applied against the abutment by a predefined distance irrespective of the pressure conditions. During the pressure-controlled phase, in contrast, a reaction can be made to the counterpressure of the primary product so that in this case a certain maximum pressure which is defined depending on the load-bearing capacity of the primary product is not exceeded. This method has the advantage in particular that damage to the primary product can be avoided even more effectively.

A possible application of these two-phase partial pressing steps consists for example in that initially a first distance, which is not critical with respect to damage to the structures, is traveled through in a distance-controlled manner, whereas the second distance, which is more critical with respect to damage can then be traveled in a pressure-controlled manner. Other applications take account of the unloading of the for example meat-like primary product during the pressure-controlled forming phase, so that despite the increasing pressure a maximum deformation result with an undamaged structure can be achieved by the alternation over time of distance-controlled and pressure-controlled forming phases within one partial pressing step.

In principle, all combinations of consecutively arranged, distance- or pressure-controlled phases are possible within a single partial pressing step, even repeated multiply. It is finally also possible for partial pressing steps to be configured as continuously forming partial pressing steps, wherein in this case the pressing step is carried out along a load curve which is predefined previously, irrespective of the reaction of the primary product which is under pressure. The reforming can be terminated when a maximum pressure or a maximum reforming distance is reached.

The predefined load curve can be linear, progressive or degressive. Furthermore, a phase of the unloading during which the pressure is slightly reduced again or also a continuous loading phase during which the pressure is kept constant, can follow. The second phase can also be characterized by a stationary stamp so that in this case a phase with a constant stamp position is provided after the first, pressure-increasing phase is complete, irrespective of the forming pressure.

The method according to the invention is therefore composed of any desired combinations of partial pressing steps of this kind, simple partial pressing steps without changing between pressure and distance control and a wide variety of pause steps with or without effect on the material.

A further configuration of the method according to the invention relates to the particular configuration of the stamp or of the abutment. Depending on the primary product, it can be possible for very high loads and very large reforming distances to occur locally, whereas other regions of the molding cavity or of the primary product are loaded or reformed to a lesser extent or not at all. It often becomes very difficult to take account of all condition beforehand, as for example different shapes of primary products are often to be formed. For example, during a meat production process a thin, flat primary product can be present for processing just as much as a cube-shaped or a vertical, narrow, tall piece of meat.

It is obvious that the loads on the stamp, the abutment and of course the primary product are completely different in the above-mentioned cases. A stamp which is elastic can take account of these conditions, so that the stamp can initially avoid peak loads in that the stamp surface deforms in a load-dependent manner. This is reversed during the course of the further stroke by the elastic restoring forces so that the desired homogeneous deformation of the primary product can take place.

In a further particular configuration of the stamp, it is also possible for it to be elastic during one or a plurality of partial steps while being stiffened during subsequent partial steps so that it has a flat pressure surface which does not migrate. To this end, the stamp can for example have a lower pressure plate which is connected via the actual stamp body by springs. These springs effect an elasticity of the stamp during the first partial steps so that the regions of greater loading are subject to lower deformation. If this stamp has reinforcing bolts which can be moved mechanically, hydraulically or pneumatically from the stamp towards the lower pressure plate, the spring effect can be interrupted so that the stamp then has a flat, no longer resilient pressure plate. These bolts can also be moved even before the start of one of the partial pressing steps so that the stamp exhibits uniform behavior in terms of spring technology during this partial pressing step but behavior including the springs during another partial pressing step.

Alternatively, these bolts can however also be used while carrying out the partial pressing step so that for example in addition to the actual pressure in the regions in which the pressure plate has migrated, the migration can be reversed by the pressure of the bolts so that in this case an additional pressing force can be exerted on the regions of increased counterpressure with the distance or pressure if the actual stamp is kept constant. This counterpressure can also be built up spontaneously or in a pressure- or distance-dependent manner.

If migration of the pressing surfaces is made possible or prevented as described above by a resilient contact force between the stamp, the abutment and the primary product which is arranged between these two structural parts, this can of course also take place on the part of the abutment. This is particularly preferable if a workpiece carrier with one or a plurality of mold cavities is used as the abutment. In this case the mold cavity can be arranged resiliently on the workpiece carrier. A resiliently mounted mold cavity of this type can either be pressed down by the stamp as far as the stop of the spring so that the spring effect is interrupted, but alternatively a special device can be provided which interrupts the spring effect.

The latter can consist in that the stamp has an outer region which can be actuated and moved separately relative to the inner region and presses the edges outside the mold cavity against a frame so that the mold cavity is fixed on the supporting edge. The inner stamp which fills out the mold cavity can then be moved into the mold cavity in order to deform the primary product. Alternatively, the workpiece carrier itself can also have the above-described bolts which can be moved from the workpiece carrier towards the frame of the mold cavity so that the latter is fixed in the pressing direction.

A further configuration of the invention can use a mold cavity which is held by hydraulic or pneumatic bearings which can be actuated selectively in such a manner that they can apply a pressure force counter to the pressing force. A three-point or four-point bearing can for example be provided which holds a frame on which the mold cavity is in turn fastened. A hydraulic or pneumatic actuation member which can press the mold cavity against the stamp can be provided at each of the bearing points. If peak loads then occur in the region of the mold cavity, the resiliently mounted mold cavity would tilt. In order to avoid precisely this, or even to be able to produce a tilt in the opposite direction, the mold cavity can then be aligned by the hydraulic or pneumatic bearings in such a manner that the pressures in the region with the greater accumulation of material are increased and thus parts of the primary product are pressed in order to achieve a more homogeneous distribution of material in the region of lower pressures.

During the partial pressing steps, the primary product can be exposed to different loads by a stamp which is moved constantly or in an accelerated or delayed manner. The entire movement of the stamp, in particular during the phase of the acceleration or of the delay, can take place in a predefined or also pressure-dependent manner. Which combination is most advantageous for the primary product is produced in each case from the consistency of the primary product and is preferably determined by experiments.

The behavior of the primary product and its loading can be determined during the method by pressure measurement. The pressure loading can be determined using the loading of the central stamp, but pressure sensors are also possible which determine the loading point by point over the entire pressure surface or in a planar manner. The latter can for example take place by using a piezoelectric sensor film by means of which the entire region of the pressure surface can be monitored. If a critical pressure is then established, either the pressure can be reduced, the exposure time of the pressure can be reduced or else the movement speed of the stamp can be reduced, while maintaining the other process variables in each case. Below the critical pressure, deformation can take place either at constant pressure force or at constant movement speed.

A preferred processing device for foods has at least one of the described forming devices. An abutment can be arranged inside this forming device if a specific contour is to be achieved, this can be a mold cavity. However a plurality of mold cavities are preferably provided per forming device so that a plurality of food products can be produced with one forming process of the forming device. A placement device can fill the multiplicity of mold cavities with primary products before applying the process pressure, alternatively a workpiece carrier can also be used which has the mold cavities and is inserted into the forming device already filled. The latter is interesting in particular when using an entire processing line.

Such a processing line can then also have a preprocessing stage if for example the primary products are first combined to form a block of food products which is then divided portion by portion into the individual primary products by a cutting device, in particular a band saw. This block can for example consist of frozen meat, with it being possible for the meat pieces to be tumbled or otherwise prepared in a non-frozen state and then combined to form a block which is then frozen.

After the primary products which have been prepared in this manner are inserted into the mold cavities or placed onto the abutment, the deformation can take place by the forming device according to the above-described method options. In the simplest case, a single forming device is used for this.

In an advantageous development of the invention, the stamp can also be contoured, that is, have a non-flat surface. Products which are supposed to be contoured on their surface can be produced hereby in one application.

Alternatively, a contoured stamp which can have for example an eccentric projection which springs towards the primary product or a plurality of ball-shaped regions can also be used for preparatory shaping inside the reforming device. In order that the lowest points of the stamp can act on all regions of the primary product, the stamp can be turned during the partial pressing steps, preferably by an angle which is produced from the total number of the partial pressing steps such that after all the partial pressing steps are complete the stamp is turned by 360°. With 6 partial pressing steps provided, a rotation of in each case 60° would therefore take place so that virtually every region of the primary product has come into contact with every region of the stamp.

The above-described rotatable stamp can be exchanged for the final forming stamp by a manual or automatic tool-changing process, or it is used in a first forming device, wherein the mold cavity together with the primary product pretreated therein is fed after the pretreatment and the associated preforming to a second forming device which then carries out the final reforming with the final forming stamp. In this two-stage deformation, a wide variety of primary products, in particular very flat primary products on the one hand and very tall primary products on the other hand, can be formed to the same contour in particular by the distance- and/or pressure-controlled application of the stamp, without the meat structure of the structure of the other food being excessively affected by excessively fast reforming speeds.

If a plurality of forming stations are used, a maximum loading can be initially reduced by the size of the stamp. The stamp can for example be so small in the first forming station that it only covers part of the mold cavity. This allows the primary product to partially evade the stamp in this early deformation stage. This evasion in turn prevents excessive degrees of deformation. If the stamp is not mounted in a rotatable manner here and is not arranged concentrically to the axis of rotation, the pressure can be exerted on different regions of the abutment or mold cavity by a plurality of partial pressing steps. In order to achieve the desired uniform contour in this configuration, the mold cavity or the abutment can then be fed to a second forming station, where a larger stamp which covers the entire mold cavity or the entire area of the primary product can then carry out the final deformation with one or a plurality of partial pressing steps.

The relaxation phases provided between the partial pressing steps can be exactly as long as the partial pressing steps, but it is also possible if required to increase or decrease the length of the relaxation phases. During the relaxation the primary product can be left completely without pressure, alternatively a certain partial pressure can also be maintained. The already described massage of the partially deformed primary product can take place during the partial pressing steps and/or during the relaxation phases by vibrations or short-wave, including those in the ultrasound range, up and down movements of the stamp or of the abutment.

Finally it is possible to take into account the degrees of deformation and the pressure profile during the preceding deformation during the partial pressing step in that either the relaxation phase or at least one of the partial pressing steps is lengthened in the event of very unfavorable pressures or degrees of deformation. To this end, pressure sensors can determine whether the stamp is exposed to a counterpressure over a longer distance range during the travel of the stamp. This produces the fact that obviously the primary product must have been reformed to a considerable extent in the pressure direction. Such a severe reforming then results in a longer relaxation phase.

If on the other hand the stamp has been moved over the same travel without counterpressure, it can be concluded from this that the primary product must have been correspondingly flat so that no great reformation can have taken place despite the long travel. This then results in turn in the optimization of the process duration in a shorter relaxation phase.

During deformation the primary product preferably has a low temperature. Forming is usually currently carried out at a temperature of minus 15°. In order to improve the flowability of the material, this temperature can be raised to just below the freezing point. As most primary products contain salt-containing substance, in this case the temperature is for example minus 5°. If no salt-containing substances are present, higher temperature can of course be selected, for example just below the freezing point of water (–0° Celsius). The higher temperatures result in it being possible for the deformation to take place more gently. The cell structures can also be prevented from being destroyed in this manner.

The method according to the invention can be used to form a primary product to a desired, predefined height. This will always be the case if for example hamburgers or pieces of meat whose shape corresponds to a schnitzel or a rump steak are to be produced. With this deformation the pressure must be exerted until the desired height is reached. So that this is possible, it must of course be ensured that not too much meat is introduced into the mold cavity if this has an outer border.

If on the other hand no defined height is to be reached, the achievement of a maximum pressure can signal the end of the forming process. In this case the meat is reformed with a maximum permissible pressure, with the height of the finished product being of secondary importance. This is in particular advantageous if the height of the food product essentially does not matter and the height differences are not all that great owing to the supplied primary products and in spite of the purely pressure-controlled process, so that nevertheless essentially uniform products for the food industry can be produced.

Furthermore, the invention relates to all methods which contain a deformation of in particular deep-frozen primary products, irrespective of whether these methods are restricted exclusively to pure deformation or whether there are processing steps upstream or downstream. In particular, products which are combined in any desired manner, partially or fully precooked or finally cooked can be included in the method. The deformed food products can be ready for consumption, require further processing and preparation, or be subjected to food treatment or modification in another manner afterwards.

The invention is however not just restricted to the above-described method. It also includes in particular the device which can be used to carry out the method and the end or intermediate product which can be produced with the device using this method.

The device necessary for carrying out the method is in the simplest case provided with just one forming device, which can apply the pressure force to the primary product in a cyclical manner or with the individual partial pressing steps which are separated from each other by relaxation phases. Optionally, this forming device can be provided with a pressure control system which can vary the applied process pressure either according to a predefined pressure profile curve or which has a sensor system so that the counterpressure which is transmitted from the primary product to the stamp can be determined on the basis of the pressure. Alternatively, the pressure on the abutment can of course also be detected. A visual recording of the reforming result, also from a plurality of viewing directions, can be used as a regulating variable.

Depending on the counterpressure or the degree of reforming, the process pressure can then be selectively increased or reduced for the stamp so that the method steps as described above can be carried out.

A further configuration of the processing line has a second forming device and a feed device by means of which the forming device or devices can be supplied with the primary products. To this end, the primary product can be produced by dividing into individual portions from a larger composite, for example the above-described deep-frozen blocks. These portions can then be distributed automatically onto the abutment or placed into the mold cavities by the feed device.

If a forming device can operate a plurality of mold cavities, this can take place by means of a common stamp which is configured on its underside in such a manner that it can penetrate into each mold cavity with individual pressure plates. A plurality of stamps can however also be provided so that each stamp makes possible the above-described method steps, in particular the pressure reactions, by itself. The latter is of course particularly preferable if different geometries of the primary product can be arranged in each mold cavity. If in contrast the primary product is sawn from blocks, each primary product will have approximately the same contour, so that a different reaction to the individual primary products can be superfluous.

The forming device preferably has a stamp which can be applied against the primary product by the known methods. A pressing cylinder can in particular be used here, which can be operated by servo technology. Of course, hydraulic or mechanical pressing devices can also be used, in the latter case the distance-controlled lowering of the stamp can take place by eccentric disks in a similar manner to a camshaft, with a resilient bearing, which can be manipulated by pneumatic or hydraulic means, allowing the pressure-regulated functioning of the stamp even in the case of the mechanical drive.

The formed foods produced by the method according to the invention are then removed from the abutment or from the mold cavity. They can then be further processed, they can in particular be subjected to a cooking process or another preparation process. A subsequent deep-freezing process for intermediate storage or for direct sale to the end consumer is of course also possible.

The invention claimed is:

1. A method of making a formed food product from a frozen primary product made of a foodstuff, the method comprising the steps of sequentially:
   introducing the frozen primary product into a cavity of a mold of a forming device having at least one pressure stamp for pressing the primary product against a floor of the mold;
   preforming the frozen primary product by pressing the frozen primary product between the stamp and the mold with a predetermined first intermediate pressure; thereafter
   in a relaxation phase and without removing the preformed frozen food product from the mold, reducing a force applied by the stamp to the preformed food product to a second force smaller than the first force; and
   after the relaxation phase and without removing the preformed food product from the mold, moving the stamp toward the floor of the mold to apply to the preformed food product a third force higher than the first force until a final shaped food product with a shape corresponding to that of the mold cavity is achieved.

2. The method according to claim 1, wherein the foodstuff is meat, fish, game, poultry, carbohydrates, or vegetables.

3. The method according to claim 1, wherein the floor of the mold is contoured.

4. The method according to claim 1, wherein a duration of the pressing with the first intermediate pressure and the pressing with the third high pressure is between 0.1 s and 60 s.

5. The method according to claim 4, wherein the duration is between 0.5 s and 2 s.

6. The method according to claim 1, further comprising the step of:
   measuring a degree of deformation of the frozen primary product during the pressing with the first intermediate pressure, and
   controlling a duration of the pressing with the first intermediate pressure based on the measured degree of deformation.

7. The method according to claim 1, wherein the pressing with the first intermediate pressure, the pressing with the second low pressure, and the pressing with the third high pressure are repeated so that when a number of the pressings with the first intermediate pressure is added to a number of the pressings with the third high pressure a total value of between 5 and 30 is achieved.

8. The method according to claim 4, wherein durations of the pressing with the first intermediate pressure and of the pressing with the third high pressure are shortened as the total value increases.

9. The method according to claim 1, wherein the pressing with the first intermediate pressure or the pressing with the third high pressure is a spontaneously forming pressing process during which a pressure force is spontaneously increased to a maximum partial pressure or a deformation distance is increased to a maximum partial deformation and the maximum partial pressure or the maximum partial deformation distance is maintained during a remaining duration of the respective pressing with the first intermediate pressure or pressing with the third high pressure processes.

10. The method according to claim 1, wherein the pressure is reduced partially during the pressing with the second low pressure and the pressure is increased in the pressing with the second low pressure at least once until a pressure corresponding to the first intermediate pressure is achieved.

11. The method according to claim 10, wherein during the pressing with the second low pressure the stamp is withdrawn from the preformed initial food product by a predefined distance in a pressure-dependent or pressure-independent manner.

12. The method according to claim 11, wherein the predefined distance is determined in a pressure-controlled manner, the method further comprising the step during the pressing with the second low pressure of:
   withdrawing the stamp along a predefined, straight, progressive or degressive pressure profile curve until a predefined set-point pressure is no longer exceeded.

13. The method according to claim 1, wherein the pressing with the first intermediate pressure and the pressing with the third high pressure process has:
   a distance-controlled forming phase; and
   a pressure-controlled forming phase carried out before or after the respective distance-controlled forming phase, the method further comprising during the pressing with the second low pressure the step of:
   pressing the stamp during the distance-controlled forming phase and the pressure-controlled forming phase against either the frozen primary product at a speed that is continuous or variable over time, but that is predetermined.

14. The method according to claim 1, wherein at least one of the pressing with the first intermediate pressure and the pressing with the third high pressure process is configured as a continuously forming pressing process during which either
   a pressure force is applied to the frozen primary product or
   a deformation distance of the frozen primary product is increased continuously until a maximum partial pressure is reached.

15. The method according to claim 14, wherein the continuously forming pressing process has a first phase of increasing pressure until the maximum partial pressure is reached and a subsequent second phase during which the maximum partial pressure is kept constant.

16. The method according to claim 14, wherein the continuously forming pressing process has a first phase with a predefined distance of a pressure stamp that generates the continuously forming pressing and a subsequent second phase with the stamp being held stationary in a pressing direction.

17. The method according to claim 1, wherein the mold is elastic at least in a transverse direction with respect to a direction of application of a force during the pressing with the first intermediate pressure and the pressing with the third high pressure in such a manner that the mold can react to locally increased loads by migration of a pressure surface of the floor.

18. The method according to claim 1, wherein the stamp has an elastic contact surface at least in a transverse direction with respect to a direction of application of a force during the first and pressing with the third high pressures in such a manner that the stamp can react to locally increased loads by migration of a pressure surface of the stamp.

19. The method according to claim 1, wherein the stamp has a plurality of individual adjacently arranged pressure elements that form a total pressure surface of the stamp and can be actuated individually, a reaction force of each pressure element be measurable by a sensor system, the method comprising, at the start of each of the pressing with the first intermediate pressure and the pressing with the second low pressure, second processing steps of:
  applying all the pressure elements are uniformly to the frozen primary product, and
  when abutment pressures arise owing to contact of the stamp against an affected part of the frozen primary product, increasing a pressure force for the stamp at least temporarily to produce a preforming of raised regions of the frozen primary frozen product.

20. The method according to claim 1, wherein the stamp has a pressure surface and an effective surface engageable with the frozen primary product, the pressure surface and an effective surface being connected to each other by at least one spring in such a manner that the effective surface can spring back in a pressure direction so that when the stamp is applied to the frozen primary product, the effective surface is initially restored counter to a spring force and only exerts a full pressure force against the frozen primary product when the spring comes to a stop.

21. The method according to claim 1, wherein the floor is elastic in a pressure direction and is formed by an elastic pad.

22. The method according to claim 1, wherein during at least a portion of either the pressing with the first intermediate pressure or the pressing with the third high pressure a pressure force applied by the stamp to the frozen primary product is kept constant and a degree of deformation is achieved over an application distance of the pressure stamp and an exposure time of the pressure force.

23. The method according to claim 1, wherein during at least a portion of either the pressing with the first intermediate pressure or the pressing with the third high pressure processes a pressure force applied by a pressure stamp to the frozen primary product with a constant pressure force such that a degree of deformation is achieved over the entire movement of the stamp.

24. The method according to claim 23, further comprising the step of:
  supporting the floor resiliently supported in a pressure direction on a pad.

25. The method according to claim 1, wherein the floor is elastic in a pressure direction and is formed by an elastic pad.

26. The method according to claim 1, further comprising the step of:
  oscillating the mold in at least one direction perpendicular to a pressure direction and such that either the frozen primary product is pressed with a slight massaging movement.

27. The method according to claim 26, wherein the oscillations are ultrasound oscillations.

28. The method according to claim 1, further comprising the step during the pressings of:
  oscillating the stamp in at least one direction perpendicular to a pressure direction such that the frozen primary product is pressed with a slight massaging movement.

29. The method according to claim 1, wherein the oscillations are ultrasound oscillations.

30. The method according to claim 1, wherein the stamp has a shape conforming to an inner cross-sectional area of the mold cavity and when introduced into the mold cavity closes the mold cavity off laterally.

31. The method according to claim 1, wherein the pressure stamp has a pressure surface that is not parallel to a floor of the mold and is rotated through an angle between the pressing with the first intermediate pressure and the pressing with the third high pressures.

32. The method according to claim 31, wherein the angle is 360° divided by the number of pressings with the first pressure and pressings with the third high pressure per frozen primary product.

33. The method according to claim 32, wherein the stamp is smaller than a cross-sectional area of the mold cavity and a pressure surface of the stamp corresponds essentially to the cross-sectional area of the mold cavity, allowing a clearance between the mold cavity and the first stamp.

34. The method according to claim 1, further comprising the step during the relaxation phase of:
  massaging the preformed initial food product by a tumbling or rotation of the stamp or of the mold about an axis parallel to a pressure direction.

35. The method according to claim 1, wherein the relaxation phase has a duration between 0.1 s and 60 s.

36. The method according to claim 1, wherein the relaxation phase has a duration that increases with an increasing number of the pressings with first pressure and pressings with the third high pressures.

37. The method according to claim 36, further comprising the step of:
  measuring a deformation speed or degree of deformation of the frozen primary product, and
  in the event of a high deformation speed or degree of deformation, extending the duration of the relaxation phase.

38. The method according to claim 1, wherein further comprising the step of:
  maintaining the frozen primary product at a temperature between −1° C. and −10° C. while the method is being carried out.

39. The method according to claim 1, further comprising the step of:
  controlling the pressure applied by or the travel of the stamp during the pressing with the first intermediate pressure and the pressing with the third high pressures for so long or so intensively until the food product is compressed to a predefined height.

40. The method according to claim 1, further comprising the step of:
  controlling the pressure applied by the stamp and the duration of pressing during the pressing with first intermediate pressure and the pressing with the third high pressure until the food product is exposed to a predefined maximum pressure.

41. The method according to claim 1, wherein the frozen primary product is a meat, fish, game or poultry, the method further comprising before the pressing with the first pressure the step of:
  gently tumbling the frozen primary product of whole pieces of meat.

42. The method according to claim 41, further comprising the steps of:
  combining the tumbled meat pieces to form a deep-frozen block, and thereafter dividing the block into the frozen primary product as a portion of the block with a desired weight by a dividing device.

* * * * *